United States Patent

Hahn et al.

[11] Patent Number: 5,985,943
[45] Date of Patent: Nov. 16, 1999

[54] EXPANDABLE POLYSTYRENE PARTICLES

[75] Inventors: Klaus Hahn, Kirchheim; Horst Steinbrecher, Römerberg; Dieter Naegele, Worms; Achim Löffler, Karlsruhe; Manfred Gürtler, Mannheim; Hagen Schmitt, Ludwigshafen; Jürgen Reichert, Limburgerhof, all of Germany

[73] Assignee: Basf Aktiengesellschaft, Ludwigshafen, Germany

[21] Appl. No.: 09/147,246

[22] PCT Filed: May 7, 1997

[86] PCT No.: PCT/EP97/02362

§ 371 Date: Nov. 12, 1998

§ 102(e) Date: Nov. 12, 1998

[87] PCT Pub. No.: WO97/43334

PCT Pub. Date: Nov. 20, 1997

[30] Foreign Application Priority Data

May 14, 1996 [DE] Germany ............ 196 19 397

[51] Int. Cl.$^6$ ............ C08J 9/224
[52] U.S. Cl. ............ 521/57; 106/122
[58] Field of Search ............ 521/57; 106/122

[56] References Cited

U.S. PATENT DOCUMENTS

| 3,991,020 | 11/1976 | Alvares et al. | 521/57 |
| 4,287,258 | 9/1981 | Hahn | 521/57 |
| 4,369,227 | 1/1983 | Hahn et al. | 521/57 |
| 5,110,835 | 5/1992 | Walter | 521/57 |

*Primary Examiner*—Morton Foelak
*Attorney, Agent, or Firm*—Oblon, Spivak, McClelland, Maier & Neustadt, P.C.

[57] ABSTRACT

The present invention relates to expandable polystyrene beads containing blowing agent which are coated with from 0.01 to 0.5% by weight of a hydrophobicizing agent which melts above 25° C. and has a mean particle size of less than 100 μm. The beads can be converted into foam moldings having reduced water absorption capacity.

17 Claims, No Drawings

EXPANDABLE POLYSTYRENE PARTICLES

The present invention relates to expandable polystyrene (EPS) beads containing blowing agent, from which moldings having a reduced water absorption capacity and/or reduced water permeability can be produced.

In many applications of polystyrene foams, for example for roof insulation materials, perimeter insulation or fish crates, the foam moldings come into contact with water, with the risk of moisture penetrating into the interior of the foam, resulting in a reduction in the insulation action.

Hitherto, the water absorption of the boards and moldings made from polystyrene foam has usually been prevented or reduced by applying a plastic film or surface coating to the finished moldings. However, this requires an additional step, and in addition this covering is not uniform everywhere in the case of complex shapes.

Another way of minimizing the ingress of water into moldings made from polystyrene foam is to keep the spaces between the EPS beads as small as possible. This can be achieved by increasing the pressure and temperature of the steam used for the expansion. However, this has the disadvantage of increasing the molding production time and, if the temperature is raised, the energy consumption.

It is an object of the present invention to provide molded polystyrene foams of reduced water absorption capacity which can be produced simply and without additional steps.

We have found that this object is achieved by EPS beads which contain blowing agent and are coated with a hydrophobicizing agent. The present invention accordingly provides expandable polystyrene (EPS) beads which contain blowing agent and are coated with from 0.01 to 0.5% by weight of a hydrophobicizing agent which melts above 10° C. and has a mean particle size of less than 100 $\mu$m. The present invention further provides correspondingly coated expanded polystyrene beads. It is usual to coat EPS beads with stearates, for example glycerol monostearate or zinc stearate, as agents for shortening the cooling time. However, these stearates do not act as hydrophobicizing agents. It is also known to apply liquid paraffin oils to EPS beads during molding production in order to shorten the cooling time, but this results in reduced expandability.

EPS beads are produced by known and conventional processes. To this end, the monomeric styrene, if desired mixed with other olefinically unsaturated comonomers, catalysts, auxiliaries and additives, is suspended in water and polymerized, usually in the presence of suspension stabilizers. The resultant polystyrene beads are separated off, washed and dried. The blowing agent can be added during the polymerization or introduced into the polystyrene beads in a subsequent step. Suitable blowing agents are $C_4$–$C_8$-hydrocarbons, preferably pentane.

The EPS beads are coated in accordance with the invention with from 0.01 to 0.5% by weight, preferably from 0.1 to 0.3% by weight, in each case based on the solids content, of a hydrophobicizing agent which melts above 10° C. and has a particle size of less than 100 $\mu$m, preferably less than 10 $\mu$m. If the particle size is too great, it is difficult to prepare a stable emulsion.

Preferred hydrophobicizing agents are paraffin waxes having 10 to 30 carbon atoms in the carbon chain, preferably those having a melting point of from 10 to 70° C., in particular from 25 to 60° C. Such paraffin waxes are present, for example, in the BASF commercial products RAMASIT KGT, PERSISTOL E and PERSISTOL HP and in AVERSIN HY-N from Henkel and CEROL ZN from Sandoz.

Another class of suitable hydrophobicizing agents comprises resinous products of the reaction of an N-methylamine with a fatty acid derivative, for example a fatty acid amide, amine or alcohol, as are described, for example, in U.S. Pat. No. 2,927,090 or GB-A 475,170. Their melting points are generally from 50 to 90° C. Resins of this type are present, for example, in the BASF commercial product PERSISTOL HP and in ARCOPHOB EFM from Hoechst.

Finally, polyfluoroalkyl (meth)acrylates, for example polyperfluorooctyl acrylate, are also suitable. The latter substance is present in the BASF commercial product PERSISTOL O and in OLEOPHOBOL C. from Pfersee.

The novel EPS beads are preferably prepared by coating with an aqueous emulsion of the hydrophobicizing agents. This emulsion contains the solid hydrophobicizing agents in an amount of from 10 to 80% by weight, preferably from 15 to 50% by weight. In addition, the aqueous emulsion preferably contains conventional emulsifiers, for example ethoxylated oleylamine, in amounts of from 0.5 to 5% by weight, and solubilizers and other conventional additives.

The aqueous emulsion of the hydrophobicizing agent is preferably applied to the EPS beads immediately after work-up and drying, expediently together with other conventional coating agents, such as antiadhesive agents, for example metal stearates and finely divided silica, and agents for shortening the demolding time, such as glycerol esters and hydroxycarboxylic acid esters. The hydrophobicizing agent can also be adsorbed onto porous solids, for example finely divided silica, preferably in amounts of from 5 to 50% by weight, and the coating carried out therewith. Since coating with the hydrophobicizing agent can increase the flammability of the foams, it is in some cases advantageous to apply flame retardants, for example bromine compounds, such as hexabromocyclododecane, in amounts of from 0.01 to 0.5% by weight, based on EPS, together with the hydrophobicizing agent. It it is in principle also possible to apply the aqueous emulsion to prefoamed EPS beads. In both cases, application is effected by spraying or preferably by drum coating in a conventional drum mixer.

Finally, the hydrophobicizing agent can also be added during production of the EPS beads by polymerization of styrene in aqueous suspension.

After the treatment of the EPS beads with the hydrophobicizing agents, the beads are dried. This is usually carried out using air at room temperature or slightly elevated temperature, although this temperature must, in the case of treatment of unfoamed beads, be sufficiently below their softening point that unintentional expansion and escape of the blowing agent is prevented. The EPS beads generally have a mean particle size of from 0.1 to 2 mm, in particular from 0.3 to 1.0 mm.

The foaming of the EPS beads containing blowing agent to give foams is usually likewise carried out by the processes known from the prior art by first preexpanding them using steam in open or closed prefoamers. Prefoamed beads are then fused by means of steam in gas-permeable molds to give moldings or boards. The expanded polystyrene beads generally have a mean particle size of from 1 to 10 mm, in particular from 2 to 8 mm.

Further details on conventional polymerization, impregnation and foaming processes are given, for example, in Kunststoffhandbuch, Volume 5, Polystyrene, edited by R. Vieweg and G. Daumiller, Carl-Hanser-Verlag, Munich, 1969.

Surprisingly, the novel treatment with the hydrophobicizing agents does not have any adverse effects on the mechanical and processing properties of the styrene polymers. Neither are the demolding times extended.

Hydrophobicizing agents are normally used to render sheetlike materials, such as textiles, leather or paper, water repellent. It was unexpected that—applied to expandable beads and after foaming and sintering thereof to give a molding—they can render the latter water-impermeable, and that the coating does not prevent fusing of the expanded beads.

The novel expanded polystyrene beads can advantageously be employed in the production of moldings which are constantly exposed to water, for example for roof insulation or perimeter insulation boards, for floats or for water-sensitive packaging materials, such as fish crates.

In the examples, parts and percentages are by weight.

The water absorption was measured in accordance with DIN 53 433, and the water permeability by the following method: a tube with a diameter of 100 mm was bonded to a foam board having a thickness of 100 mm and filled with a water column 100 mm in height.

After 24 hours, it was checked whether any water could be observed on the underside of the foam board. The lowering of the water level was measured in mm water column. Before the experiments, the foam boards were conditioned at 60° C. for 24 hours in a drying cabinet. The tubes were then stuck on by means of silicone rubber.

EXAMPLE 1

25 kg of EPS (bead size 0.4–0.7 mm, pentane content 6.1%) were mixed vigorously for 10 minutes at 25° C. with the coating compositions shown in Table 1 in a paddle mixer with a capacity of 40 l.

The coated beads were then prefoamed in an unpressurized expansion chest (Rauscher system) and after 12 hours converted into molded boards (density 20 kg/M$^3$).

Table 1 shows the composition of the coatings and the properties measured on the boards. Experiment 1 is not in accordance with the invention.

TABLE 1

| Experiment | coating %, based on EPS | Water absorption % | Water permeability mm |
|---|---|---|---|
| 1 | 0.25 GMS<br>0.12 Aerosil R 972<br>0.13 zinc stearate | 5.8 | 28 |
| 2 | 0.25 GMS<br>0.12 Aerosil R 972<br>0.13 zinc stearate<br>0.25 Persistol HP | 0.21 | 2 |
| 3 | 0.15 GMS<br>0.075 Aerosil R 972<br>0.075 zinc stearate<br>0.2 Persistol HP | 0.30 | 2 |
| 4 | 0.25 GMS<br>0.12 Aerosil R 972<br>0.13 zinc stearate<br>0.25 Ramasit KGT | 0.20 | 0.5 |
| 5 | 0.15 GMS<br>0.075 Aerosil R 972<br>0.075 zinc stearate<br>0.2 Ramasit KGT | 0.19 | 1 |
| 6 | 0.15 GMS<br>0.12 Aerosil R 972<br>0.13 zinc stearate<br>0.1 Persistol HP | 0.9 | 5 |

GMS = technical-grade glycerol monostearate
Aerosil R 972 = finely divided silica (DEGUSSA)
Persistol HP = hydrophobicizing agent from BASF, aqueous emulsion containing 22.8% of paraffin (melting point 52–54° C.) and 9.6% of resin made from N-methylolmelamine and stearamide (melting point 70° C.)
Ramasit KGT = hydrophobicizing agent from BASF, aqueous emulsion containing 16.6% of paraffin (melting point 52–54° C.)

EXAMPLE 2

The procedure was as in Example 1, but the hydrophobicizing agents were not employed as aqueous emulsions, but instead adsorbed onto finely divided silica (Table 2).

TABLE 2

| Experiment | Coating %, based on EPS | Water permeability |
|---|---|---|
| 1 | 0.05 paraffin<br>0.10 Aerosil R 972<br>0.34 GTS<br>0.11 Zinc stearate | impermeable |
| 2 | 0.012 resin N/S<br>0.10 Aerosil R 972<br>0.36 GTS<br>0.125 Zinc stearate | impermeable |

Resin N/S is a product of the reaction of N-methylolamine and stearylamide.
GTS denotes glycerol tristearate.

EXAMPLE 3

The procedure was as in Example 1, but various amounts of hexabromocyclododecane (HBCD) were added to the coating as flame retardant. Table 3 shows the results; in fire test B2 in accordance with DIN 4201, the burning time until extinction of the flame was measured.

TABLE 3

| Experiment | Coating %, based on EPS | Water permeability | Burning time sec. |
|---|---|---|---|
| 1 | 0.32 GTS<br>0.1 Aerosil R 972<br>0.08 Zinc stearate | permeable | 4.8 |
| 2 | 0.32 GTS<br>0.1 Aerosil R 972<br>0.08 Zinc stearate<br>0.1 Persistol HP | impermeable | 6.5 |
| 3 | 0.32 GTS<br>0.1 Aerosil R 972<br>0.03 Zinc stearate<br>0.1 Persistol HP<br>0.05 HBCD | impermeable | 4.6 |
| 4 | 0.32 GTS<br>0.1 Aerosil R 972<br>0.1 Persistol HP<br>0.08 HBCD | impermeable | 4.4 |

EXAMPLE 4

Experiment 1

124 g of expandable polystyrene beads having a mean diameter of 0.9 mm were prefoamed for 2 minutes to a density of 35 g/l in an unpressurized expansion chest of the Rauscher type. After interim storage for 24 hours, the prefoamed beads were immersed for 15 minutes in a bath containing a 17% strength aqueous emulsion of Persistol 0 from BASF AG which had been adjusted to pH 4 by means of acetic acid.

The beads were then dried by means of cold air, transferred into a mold with a thickness of 5 cm and a diameter of 25 cm and fused by means of steam to give a molding. The fluorine content of the molding was 0.22 g/100 g.

In order to determine the water absorption capacity, a water column with a diameter of 10 cm and a height of 10 cm was allowed to act on the molding. After 24 hours, the water level dropped by 2 mm.

Experiment 2 (comparison)

The procedure was as in Experiment 1, but no treatment with the aqueous emulsion of Persistol O was carried out.

In order to determine the water absorption capacity, a water column with a diameter of 10 cm and a height of 10 cm was allowed to act on the molding. After 24 hours, the water level dropped by 40 mm.

Persistol O is a hydrophobicizing agent from BASF which contains polyperfluorooctyl acrylate.

We claim:

1. Expandable polystyrene (EPS) beads containing blowing agent, which are coated with from 0.01 to 0.05% by weight of a hydrophobicizing agent and with finely divided silica, the hydrophobicizing agent having a mean particle size of less than 100 μm and melting above 10° C. wherein said hydrophobicizing agent is a paraffin wax having 10 to 30 carbon atoms in the carbon chain, a product of the reaction of an N-methylolamine and a fatty acid derivative, or a polyfluoroalkyl (meth)acrylate.

2. Expandable polystyrene beads as claimed in claim 1, wherein the hydrophobicizing agent is a paraffin wax having 10 to 30 carbon atoms in the carbon chain.

3. Expandable polystyrene beads as claimed in claim 1, wherein the hydrophobicizing agent is a product of the reaction of an N-methylolamine and a fatty acid derivative.

4. Expandable polystyrene beads as claimed in claim 1, wherein the hydrophobicizing agent is a polyfluoroalkyl (meth)acrylate.

5. Expandable polystyrene beads as claimed in claim 1, wherein the weight ratio of hydrophobicizing agent to silica in the coating is from 5:95 to 50:50.

6. Expandable polystyrene beads as claimed in claim 1, which have been coated with an aqueous emulsion of the hydrophobicizing agent.

7. A process for the production of expandable polystyrene beads as claimed in claim 1, which comprises treating expandable polystyrene beads with an aqueous emulsion containing from 10 to 80% by weight of the hydrophobicizing agent.

8. A process as claimed in claim 7, wherein the aqueous emulsion additionally contains an emulsifier and/or a solubilizer.

9. A process as claimed in claim 7, wherein flame retardants and/or antilumping agents and/or agents for shortening the demolding time are applied to the EPS beads in addition to the hydrophobicizing agent.

10. A process as claimed in claim 7, wherein the treatment is effected by spraying or drum coating.

11. A process as claimed in claim 7, wherein the aqueous emulsion of the hydrophobicizing agent is absorbed in finely divided silica, and the expandable polystyrene beads are coated with the resultant powder mixture.

12. A process for the production of expandable polystyrene beads as claimed in claim 1, wherein the hydrophobicizing agent is adsorbed onto finely divided silica, and the EPS beads are coated therewith.

13. A process for the production of expandable polystyrene beads as claimed in claim 1, which comprises adding the hydrophobicizing agent during the production of the EPS beads by polymerization of styrene in aqueous suspension.

14. Expanded polystyrene beads coated with from 0.01 to 0.5% by weight of a hydrophobicizing agent as claimed in claim 1 and with finely divided silica.

15. A process for the production of expanded polystyrene beads, which comprises foaming coated EPS beads as claimed in claim 1.

16. A process for the production of expanded polystyrene beads, which comprises coating expanded polystyrene beads with from 0.01 to 0.5% by weight of a hydrophobicizing agent as claimed in claim 1 and with finely divided silica.

17. A method for the production of roof insulation materials, perimeter insulation boards, floats or water-sensitive packaging materials, comprising preparing said materials, floats and boards from the polysterene beads as claimed in claim 14.

* * * * *